United States Patent Office 3,463,999
Patented Aug. 26, 1969

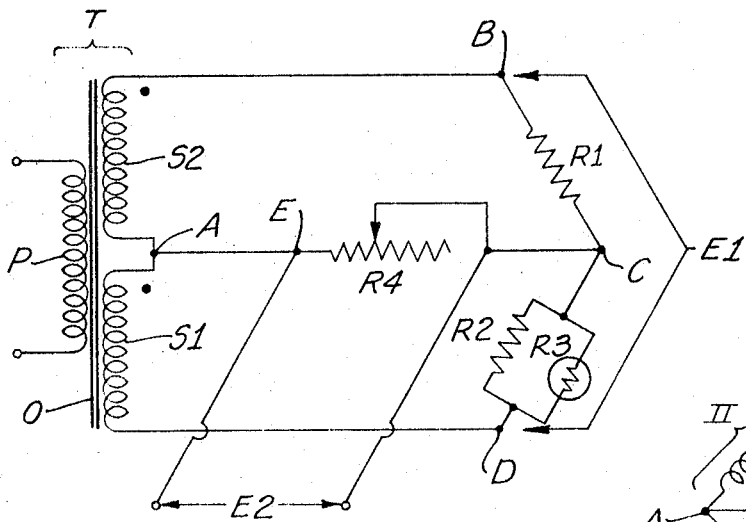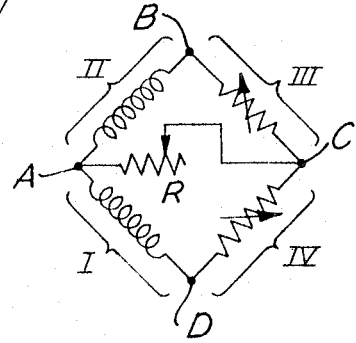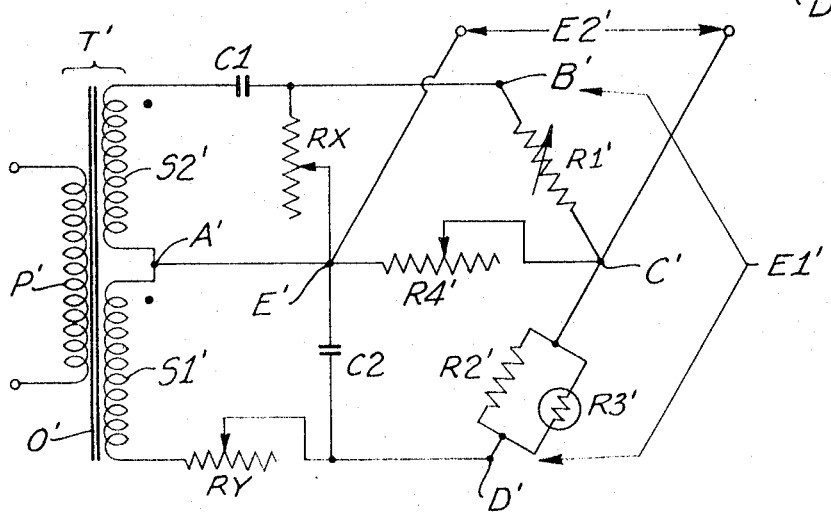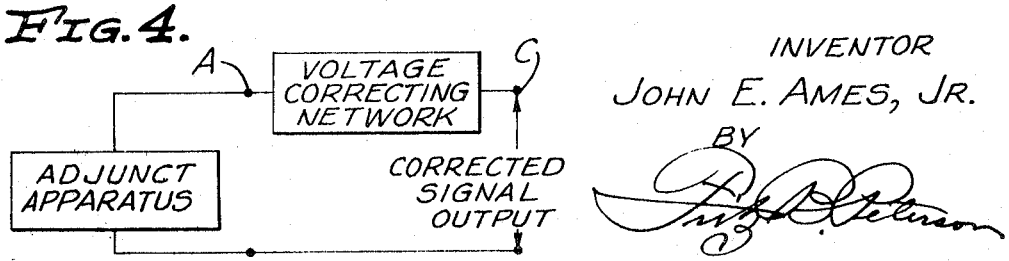
INVENTOR
JOHN E. AMES, JR.

3,463,999
A.C. APPARATUS TEMPERATURE COMPENSATION
John E. Ames, Jr., Riverside, Calif., assignor to Bourns, Inc., a corporation of Delaware
Filed May 8, 1967, Ser. No. 636,701
Int. Cl. G05f *1/10, 3/02;* G01r *17/02*
U.S. Cl. 323—69                                    10 Claims

ABSTRACT OF THE DISCLOSURE

Means adapted to be energized from an A.C. power source and having a circuit device arranged to be connected in series with an adjunct apparatus energized by the same power suorce or a different source of the same frequency and adapted to provide A.C. voltage or potential correction or compensation to the adjunct apparatus for the electrical effects of mechanical, magnetic, and electrical changes in the components of the adjunct apparatus which effects result from changes in the ambient temperature.

Summary of the invention

The potential-correcting or compensating network or circuit is simple, comprising only components the selection of which is not in any sense critical, and is easily and quickly adjusted to provide at output terminals or network junctions the potential required to correct temperature-change-induced variations in the voltage produced by the adjunct apparatus to which it is connected. The voltage-compensating circuit or network comprises a bridge network having first, second, third and fourth bridge limbs connected serially in a loop and having first, second, third and fourth bridge network junctions, the first junction being between the first and second limbs and the third junction being between the third and fourth limbs, and the network comprising a resistor of selected or adjustable value and capable of being connected between the first and third junctions and connected to one of the latter; the first and second limbs comprising respective ones of first and second A.C. potential supplying devices such as first and second transformer secondary windings or like A.C. potential-providing devices, connected in a series-aiding relationship and capable of providing A.C. potential considerably in excess of that required to compensate the A.C. voltage or signal produced by the adjunct apparatus, and the third and fourth limbs of the bridge network comprising in at least one of those limbs a resistive device or net characterized by a high temperature coefficient of resistivity (Tc) selected from among high negative Tc and high positive Tc, but in a preferred embodiment including in the third limb a resistive device or net characterized by a high Tc of one algebraic sign and in the fourth limb a resistive device or net characterized by a high Tc of algebraic sign opposite that of the resistive device or net of the third limb, and the bridge network being capable of being balanced at the mid-temperature of the temperature range over which the adjunct apparatus is expected to be capable of operating with substantially linear temperature compensation, said balancing of the bridge network being effected by simple adjustment of the resistance of one or both of said third and fourth limbs at said mid-temperature whereby with said resistor connected between said first and third junctions and with the ambient temperature brought to either extreme temperature of said temperature range, the resistive value of said resistor can be selected or adjusted to provide for said adjunct apparatus a compensating or correcting potential which when algebraically combined with the output voltage or signal of the adjunct apparatus fully and precisely compensates for the noted changes in that output or signal resulting from the change of the ambient temperature from said mid-temperature to said extreme temperature and which compensating or correcting potential across said first and third bridge network junctions will thereafter automatically vary with variations in ambient temperature within said temperature range to fully compensate said output voltage or signal of said adjunct apparatus for temperature-variation-induced changes in said output voltage or signal. In the preferred form the bridge network comprises as first and second limbs, first and second transformer windings connected in series-aiding relation with the first bridge-network junction therebetween, and comprises as said third and fourth limbs respective third and fourth resistive devices or nets one of which is characterized by high negative (−) Tc and the other by high positive (+) Tc, the third and fourth limbs connected in series with the third bridge network junction therebetween, and said network further comprising as the resistor for connection between the first and third junctions a variable resistor initially connected to either of said first and third junctions and finally connected between the latter junctions, and said network arranged to be connected at said first and third junctions, as an element in series with the signal-producing circuit means of the adjunct apparatus. The resistive device or net characterized by high +Tc preferably includes an alloy resistive device such as platinum or nickel-iron alloy, and that characterized by high −Tc preferably includes a thermistor or like device, and either or both of said +Tc and −Tc nets may comprise shunting or series resistors of low Tc character. Also, preferably the first and second limbs are made electrically similar, and hence have approximately equal impedances; and similarly, the impedance (resistance) values of the third and fourth limbs are made to be equal at a selected temperature (e.g., the mid-temperature) in the temperature range within which the adjunct apparatus and the bridge network are intended to operate and at which selected temperature no compensation effect is required for the adjunct apparatus.

According to the invention, with the resistor to be connected between the first and third junctions removed or open-circuited and the bridge circuit energized to cause the first and second limbs to provide A.C. potentials, the bridge is brought into balanced condition; that is, the bridge network is adjusted by changing the resistive devices or nets in one or both of the third and fourth limbs until the voltage across the first and third junctions is zero, the temperature being at the selected or mid-range value. The variable resistor is then connected between the noted first and third junctions. The components of the bridge network are selected to provide between the second and fourth junctions a potential variation substantially in excess of (e.g., of the order of four to five times as much as) the potential variation between the first and third junctions over a temperature range of, for example, 100° F., assuming an instrument operating range of 200° F. Following connection of the correction network to the adjunct apparatus to be corrected, variation or selection of the value of the noted resisor is used to attenuate the potential supplied by the bridge across the second and fourth junctions so as to provide the desired temperature compensating potential to the adjunct apparatus circuit being corrected. As will be evident, if the output or signal voltage of the circuit to be corrected is ten volts at 25° C. ambient temperature and is eleven volts at 7.5° C. ambient, then the correcting network must supply one volt at opposing phase relationship (180° out of phase) with the voltage to be corrected. Similarly, if the change of the output or signal voltage of the circuit to be corrected is negative, that is, for example, a drop to nine volts at 75°

C., then the correcting network must supply one volt, in phase, to be serially added with the said output or signal voltage to bring the latter to the value obtained at 25° C. If other than in-phase and opposed-phase corrections are required, as if there is a component in quadrature with the principal voltage signal, then phase-shifting means are included in the correcting network whereby to permit the latter to produce a potential of the proper phase-relationship to that of the corrected circuit to compensate the voltage-change of the latter.

The preceding abstract presents a brief general description fo the invention. Therein it is made evident that it is a principal object of the invention to provide improved means and methods for compensating changes in voltages in A.C. electrical apparatus which occur as a result of changes of ambient temperature.

Another object of the invention is to provide an improved method of effecting correction of temperature-change effects in A.C. apparatus.

Another object of the invention is to provide a simple, easily made network or circuit which can be connected in series with the output signal circuit of an A.C. apparatus and adjusted to effect compensation of the output circuit voltage for changes attributable to change of ambient temperature.

Other objects and advantages of the invention will hereinafter be set out or made evident in the appended claims and the following description of preferred exemplary simple and sophisticated circuits incorporating the principles of the invention, the description having reference to the accompanying drawings forming a portion of this specification and in which drawings:

FIGURE 1 is a schematic diagram illustrating a simple form of network or circuit arrangement according to the invention, showing arrangement and connection of components more particularly adapted for effecting compensation of A.C. voltages which are temperature-variable but are in-phase or in phase-opposition to A.C. potential of a selected A.C. potential source;

FIGURE 2 is a schematic circuit diagram similar to FIGURE 1, but including means for effecting correction of temperature-variable potentials irrespective of phase relationship between the potential of the apparatus to be corrected and that of the correcting circuit;

FIGURE 3 is an explanatory diagram illustrating limbs and junctions of a four-limbed bridge network; and FIGURE 4 is an explanatory diagram illustrating connection of the invention with an adjunct apparatus.

Referring first to FIGURE 3, a four-limbed bridge network is depicted in schematic form, the bridge comprising first, second, third and fourth limbs I, II, III and IV, respectively, arranged in a series loop with first, second, third and fourth inter-limb junctions A, B, C and D, respectively, the network further comprising a selected resistor (here shown as an adjustable resistor) R, connected between the first and third junctions A and C. The terminology thus noted will be hereinafter followed in the description of preferred embodiments of the invention and in the appended claims.

Referring now to FIGURE 1, which schematically illustrates the simpler of the two above-noted circuits, alternating current power of the frequency (f) of the voltage to be corrected, is supplied to the primary P of a transformer T. As will herein be made evident to those skilled in the electronics arts, the power supplied to primary P may be either in phase with, or in phase opposition with, the alternating current voltage to be corrected. Ordinarily the A.C. voltage to be corrected will be derived from the same primary power source as that used to supply primary P of transformer T, and vice versa, but with electrical isolation for obvious reasons.

The transformer T comprises further a care O, and a pair of preferably equal secondary windings S1 and S2 which are connected in a series aiding relationship as indicated in FIGURE 1. As will be evident to those skilled in the electrical instrumentation arts, the transformer T may include a plurality of other secondary windings for other purposes, one or more of which supplies power to means an output voltage of which it is desirable to correct or compensate for effects caused by change of ambient temperature, and which means may be an adjunct apparatus in the sense that term is herein used. An example of such use of the transformer T is illustrated in the transformer connected in the apparatus disclosed in application for Letters Patent of John E. Ames, Jr., Ser. No. 636,868, filed May 8, 1967, concurrently with the present application and entitled Variable Reluctance Transducer, (now Patent No. 3,421,126) and to which disclosure reference may be made if necessary and which disclosure is incorporated herein by reference.

The first and second secodnary windings S1 and S2 of the transformer T are connected as respective first and second limbs of a bridge circuit as shown. Third and fourth limbs of the bridge circuit are in the present exemplary network constituted by an alloy resistor R1 characterized by a positive temperature coefficient of resistivity ($+Tc$), and a parallel resistive net including a resistor R2 and a thermosensitive resistor R3 such as a thermistor characterized by a negative temperature coefficient of resistivity ($-Tc$), respectively, all connected as indicated in FIGURE 1. A loading resistor R4 which preferably is adjustable but may be of a selected value, is connected across one diagonal of the bridge circuit, between the first and third junctions A and C. Resistor R1 in an exemplary mode is cut or tailored to a particular value whereby to balance the bridge at a selected temperature, while the diagonal connection between junctions A and B is open-circuited. Resistor R1 further is in the exemplary described embodiment of the network of a metal or alloy or the like having a high temperature coefficient of resistivity ($Tc$). For examples, resistors of platinum, nickel, and nickel iron, respectively, may be cited as among those suitable and which are characterized by increase of exhibited resistance with increase of temperature at a rate of the order of 20% to 25% per 100° F. increasing change of temperature.

Continuing with description of the components of the network of FIGURE 1, in an exemplary case the thermistor (R3) comprised in the fourth limb of the network is preferably selected to have a resistance value at 75° F. (room temperature) approximately equal to the value of R2, and the latter is chosen from among resistors having small or minor variation of resistance with change of temperature. Further, the value of R1 is chosen so as to be approximately equal to the resistance exhibited by the parallel combination of R2 and R3. Thus, assuming approximately equal windings S1 and S2, there is initially an approximately balanced condition of the bridge. That balance can be reduced to as small degree or percentage of unbalance as may be desired by any usual balancing technique such as by shunting or adjusting one or both of resistive devices R1 and R2. Once such adjustment is accomplished (with R4 open-circuited by opening the diagonal circuit A–C), the bridge circuit can provide a voltage variation (across junctions A–C) of the order of 30% of the voltage across the other bridge diagonal (across junctions B–D) for each 100° F. of temperature change.

Introduction of loading resistor R4 into circuit between junctions A and C reduces the potential variation per 100° F. exhibited across those junctions in dependence upon the setting or value of R4. The network is so constructed that the potential E1 exhibited between junctions B and D is in excess of that required for production across junctions A and C of the correcting potential required to compensate the voltage or output signal of the adjunct apparatus it is desired to correct or compensate. In use, the appurtenant or adjunct apparatus and the bridge network which generates the correcting potential are brought to a temperature at which no voltage correction or compensation is desired or necessary (for example at the mid-temperature in the range of temperatures over which the appurtenant or adjunct apparatus is expected to be required to operate), and the bridge network is then balanced by adjustment of the resistive devices in one or both of the third and fourth limbs. For example the balancing may be effected by connecting a shunting resistance across R1, or across R3, or by use of a series resistance in either limb. Thereafter, the adjunct apparatus and the network are brought to a temperature at either extreme of the noted operating temperature range and at which extreme temperature it is expected that the apparatus may be used, and the network is adjusted by means of adjustment or selection of resistor R4 to provide across junctions A and C that potential which is required to be algebraically combined with the voltage produced as an output signal by the adjunct apparatus. The output circuit of the adjunct apparatus is connected in series with the bridge network junctions A–C as indicated in FIGURE 4, that is, in series with R4, to use the correcting or compensating potential E2.

If it is assumed that the potential across junctions B and D remains constant, the compensating potential produced across junctions A and B provides substantially linear voltage correction for temperature changes within an operating range of 200° F. Compensation over a more extensive temperature-change range may be accomplished in a more linear mode by omitting the thermistor R3 and operating the bridge network at a lower relative sensitivity, as will be evident to those skilled in the art.

As is made evident to those skilled in the electronics arts by the preceding description, choice of the components of the bridge network involves no careful selection of critical-valued components, that is, only approximate values of resistance need be selected in choosing resistive elements for the network. That is in strong contrast to the very precise selection of components, detailed determination of temperature/voltage or temperature/resistance characteristics of components, and careful adjustment of circuitry that are associated with prior-art temperature compensation schemes and techniques. The circuit of the present invention not only does not require careful selection and matching of precision components to desired characteristics but provides with very inexpensive circuit means a precise amount of voltage correction for temperature change over a very wide temperature spectrum.

In those situations wherein the power for the voltage-correcting circuit of the invention cannot be derived from the same source as is used for operation of the adjunct apparatus or instrument to which the correcting or compensating potential is to be provided, or wherein there may be an arbitrary phase difference between the two power supply lines, it is desirable to provide for phase-shifting of the correcting A.C. potential whereby the latter may be brought into exact phase coincidence or exact phase opposition with the voltage to be corrected. To that desirable end a modified form of the voltage-correcting circuit is comprehended, within the scope of the invention, in which circuit means are provided for bringing the produced correcting potential into phase with the voltage to be corrected.

As indicated schematically in FIGURE 2, principal components and interconnections of the circuitry are similar to, or the same, as those of the previously described circuit. Thus the transformer T' may be identical, or similar, to transformer T, preferably having approximately equal secondary windings S1' and S2'. Likewise, resistor R1' is a counterpart of resistor R1, and the same is true of the relationship between the parallel resistive net R2'–R3' and R2–R3. Selected or variable resistor R4' may be like R4 in all essential respects; and the correcting potential E2' is derived across junctions A'–C' as indicated.

To shift the phase of the potential produced across the series-aiding transformer secondary windings S1'–S2' so that the compensating A.C. potential derived across junctions A'–C' (resistor R4') will be in phase coincidence with the voltage to which the compensating potential is to be applied by algebraic addition, phase-shifting components, capacitor unit C1, resistor RX and capacitor unit C2 and resistor RY are connected in the bridge circuitry as indicated. These phase-shifting circuit components are selected in accord with established principles of electrical circuit design and so as to be compatible with the remainder of the bridge network. As is evident to those skilled in the art, by adjustment of variable resistors RX and RY, with concurrent observation of the phase relationship between the correcting A.C. potential and the A.C. potential to be corrected, the desired phase adjustment is accomplished. Variable capacitors may be used in lieu of capacitive devices C1 and C2. In other respects, and following any necessary phase-relationship adjustment, balancing and conditioning the bridge network of FIGURE 2 is the same as that described previously in respect of the circuit of FIGURE 1.

As is made evident in FIGURE 4, the resistive component R4 (or R4') is in effect connected in series with the output signal circuit of the adjunct apparatus, since the junctions A and C (or A' and C') are connected in series with the output voltage or signal of the apparatus whose voltage signal varies with variations in the ambient temperature.

I claim:

1. A network adapted to provide a temperature-variable A.C. potential for algebraic combination with an A.C. voltage produced by an adjunct apparatus the produced voltage of which is characterized by undesirable variations with variations of the ambient temperature to compensate said A.C. voltage for such undesirable variations, said network comprising:

a bridge network having first, second, third and fourth limbs connected serially in a loop with first, second, third and fourth limb junctions, said first and second bridge limbs comprising first and second electrically-isolated A.C. potential-producing devices connected in a series-aiding relation with said first junction therebetwen; said potential producing devices capable of producing a potential considerably in excess of that required to compensate for said undesirable variations, said third limb comprising a first resistive device connected to said second limb at said second junction, said fourth limb comprising a second resistive device connected between said third and fourth junctions and characterized by a high temperature coefficient of resistivity (Tc);

said network comprising an additional resistive device connected in one of said third and fourth limbs; and an adjustable resistor for connection between said first and third junctions and connected to one of the latter junctions;

whereby with said adjustable resistor open-circuited said bridge network may be balanced at a temperature approximately at the mid-temperature of the temperature range over which the adjunct apparatus is expected to be operated, by adjustment of the combination comprising said first, second and additional resistive devices among said third and fourth limbs, and thereafter with the temperature at either extreme of said temperature range and with said adjustable resistor connected in circuit between said first and third junctions the value of said adjustable resistor may be adjusted to provide thereacross the voltage required to at said extreme of said temperature range provide the proper compensating A.C. potential for said adjunct apparatus at that extreme temperature and to automatically thereafter throughout said temperature range provide the proper compensating A.C. potential for said adjunct apparatus.

2. A network according to claim 1, in which said first and second bridge network limbs comprise respective ones of first and second transformer secondary windings of approximately equal A.C. voltage output rating.

3. A network according to claim 1, in which said third limb comprises a resistive device characterized by a high positive temperature coefficient of resistivity, and in which said fourth limb comprises a resistive device characterized by a high negative temperature coefficient of resistivity.

4. A network according to claim 1, in which the temperature coefficient of resistivity of said second resistive device comprised in said fourth limb of said bridge network is positive.

5. A network according to claim 1, in which the temperature coefficient of resistivity of said second resistive device comprised in said fourth limb of said bridge network is negative.

6. A network according to claim 1, in which said additional resistive device connected in one of said third and fourth limbs is a resistor having a low temperature coefficient of resistivity and is connected in shunt with a resistor having a high negative temperature coefficient of resistivity.

7. A network according to claim 1, in which when said resistor is of substantially infinite value and said first and second potential-producing devices produce respective potentials, and the ambient temperature is room temperature, said bridge network is electrically balanced.

8. A network according to claim 1, in which said first and second bridge network limbs comprise respective approximately equal transformer secondary windings and said windings are energized by a common magnetic core, and in which network said third limb comprises a resistive device characterized by a high positive temperature coefficient of resistivity and said fourth limb comprises a resistive net including a resistive device characterized by a high negative coefficient of resistivity.

9. A network according to claim 1, in which phase-shifting circuit means are connected in said bridge network, said phase-shifting means comprising a variable component for varying the phase shift of the potential produced by one at least of said potential-producing devices, whereby the phase of the potential produced for algebraic addition to the A.C. voltage of the adjunct apparatus is brought into a selected phase relationship with said A.C. voltage, the selected phase relationship being selected from among phase coincidence and phase opposition.

10. Means to produce an A.C. potential of phase and magnitude necessary to be algebraically combined with the output signal of an adjunct A.C. voltage-producing apparatus to correct the signal for effects incident to change of ambient temperature above or below a selected temperature within an operating temperature range, said means comprising:

first and second circuit means for generating respective first and second A.C. potentials in series-aiding relationship and of the same frequency as the voltage the temperature-induced variations of which are to be corrected;

third and fourth circuit means connected in series and connected in series with said first and second circuit means to form a closed loop four limbed bridge network, one of said third and fourth circuit means comprising a resistive device having a high temeperature coefficient of resistivity, said bridge network being balanced at said selected temperature; and a resistive device connected at one end between said first and second circuit means and at the other end between said third and fourth circuit means and being of such selected value of resistance that at an extreme temperature at either extreme of said operating temperature range a potential drop is produced thereacross of the exact magnitude and polarity for serial alegbraic addition to said signal to correct said signal for changes caused by change of temperature from said selected temperature to said extreme temperature, whereby incident to connection of said resistive device in series with said output signal the latter will be substantially linearly corrected for temperature-change induced effects throughout said temperature range.

References Cited
UNITED STATES PATENTS

| 3,278,834 | 10/1966 | Perino | 323—69 |
| 3,408,562 | 10/1968 | Mazurkevics | 324—105 X |
| 3,085,193 | 4/1963 | Perino. | |
| 3,104,385 | 9/1963 | Evalds. | |
| 3,341,121 | 9/1967 | Attridge et al. | |

JOHN F. COUCH, Primary Examiner

G. GOLDBERG, Assistant Examiner

U.S. Cl. X.R.

323—75, 123; 324—105